United States Patent
Shah et al.

(10) Patent No.: US 10,666,053 B2
(45) Date of Patent: May 26, 2020

(54) CONTROL SYSTEM FOR VOLTAGE REGULATION DEVICE

(71) Applicant: Eaton Intelligent Power Limited, Dublin (IE)

(72) Inventors: Jalpa Kaushil Shah, Woodbury, MN (US); Richard John Kaluzny, Greenfield, WI (US); Kyle James Heiden, Milwaukee, WI (US); Daniel Joseph Daley, Waukesha, WI (US)

(73) Assignee: Eaton Intelligent Power Limited, Dublin (IE)

( * ) Notice: Subject to any disclaimer, the term of this patent is extended or adjusted under 35 U.S.C. 154(b) by 23 days.

(21) Appl. No.: 16/202,299

(22) Filed: Nov. 28, 2018

(65) Prior Publication Data
US 2019/0199098 A1 Jun. 27, 2019

Related U.S. Application Data
(60) Provisional application No. 62/608,931, filed on Dec. 21, 2017.

(51) Int. Cl.
*H02J 3/38* (2006.01)
*H02J 3/18* (2006.01)
(Continued)

(52) U.S. Cl.
CPC ............... *H02J 3/381* (2013.01); *G05F 1/14* (2013.01); *H02J 3/12* (2013.01); *H02J 3/1878* (2013.01); *H02J 3/382* (2013.01); *H02J 3/16* (2013.01)

(58) Field of Classification Search
CPC ........ H02J 3/81; H02J 3/18; H02J 3/38; H02J 3/1878; H02J 3/382; H02J 3/16; G05F 1/14
See application file for complete search history.

(56) References Cited

U.S. PATENT DOCUMENTS 5,969,509 A 10/1999 Thorvaldsson

FOREIGN PATENT DOCUMENTS

WO 2007050430 A2 5/2007
WO 2013086238 A1 6/2013

OTHER PUBLICATIONS

John Mead et al., Energy Research and Development Division, Final Project Report, "Advanced Control Technologies for Distribution Grid Voltage and Stability with Electric Vehicles and Distributed Generation," Mar. 2015, CEC-500-2015-046, 79 total pages.
(Continued)

*Primary Examiner* — Robert L Deberadinis
(74) *Attorney, Agent, or Firm* — DiBerardino McGovern IP Group LLC (57) ABSTRACT

A system for an electrical power distribution network receives electricity from one or more distributed energy resources. The system includes a voltage regulation device configured to maintain a voltage in the electrical power distribution network within a range of voltages, the voltage regulation device including a voltage sampling module configured to obtain an indication of a voltage in the electrical power distribution network; and a control system coupled to the voltage regulation device, the control system configured to: determine a metric related to a time rate of change of the voltage in the power distribution network based on at least two samples of the voltage in the electrical power distribution network obtained at different times; and change at least one operating parameter and/or an operating mode of the voltage regulation device based on the determined rate of change of the voltage.

12 Claims, 7 Drawing Sheets

(51) Int. Cl.
*G05F 1/14* (2006.01)
*H02J 3/12* (2006.01)
*H02J 3/16* (2006.01)

(56) References Cited

OTHER PUBLICATIONS

Cooper Power Series, Voltage Regulators, MN225003EN, "CL-7 Voltage Regulator Control Installation, Operation, and Maintenance Instructions," Jul. 2017, Section 4: Control Operation, pp. 25-28.
Marianne Hartung et al., "Comparative Study of Tap Changer Control Algorithms for Distribution Networks with High Penetration of Renewables," CIRED Workshop, Paper 0376, Jun. 12, 2014, XP055566295, pp. 1-5 (5 total pages).
A. Eberle GmbH & Co. KG, "User Manual—REG-D Relay for Voltage Control and Transformer Monitoring," Jul. 31, 2016, XP055566764, https://www.a-eberle.de/sites/default/files/media/ba_REG_D_en_2016_07_web.pdf, pp. 1, 6, and 127-144 (20 total pages).
International Search Report and Written Opinion, counterpart PCT Application No. PCT/EP2018/025329, dated Mar. 19, 2019, 21 pages total.

CONTROL SYSTEM FOR VOLTAGE REGULATION DEVICE

CROSS-REFERENCE TO RELATED APPLICATION

This application claims the benefit of U.S. Provisional Application No. 62/608,931, filed on Dec. 21, 2017 and titled CONTROL SYSTEM FOR VOLTAGE REGULATION DEVICE, which is incorporated herein by reference in its entirety.

TECHNICAL FIELD

This disclosure relates to a control system for a voltage regulation device. The voltage regulation device may be, for example, a load tap changer, a line voltage regulator, or a switched capacitor. The voltage regulation device is used in an electrical power distribution network.

BACKGROUND

Voltage regulators are used to monitor and control a voltage level in an electrical power distribution system.

SUMMARY

In one general aspect, a system for an electrical power distribution network receives electricity from one or more distributed energy resources. The system includes a voltage regulation device configured to maintain a voltage in the electrical power distribution network within a range of voltages, the voltage regulation device including a voltage sampling module configured to obtain an indication of a voltage in the electrical power distribution network; and a control system coupled to the voltage regulation device, the control system configured to: determine a metric related to a time rate of change of the voltage in the power distribution network based on at least two samples of the voltage in the electrical power distribution network obtained at different times; and change at least one operating parameter and/or an operating mode of the voltage regulation device based on the determined rate of change of the voltage.

Implementations may include one or more of the following features. The metric related to the time rate of change of the voltage in the power distribution network may be an amount of change in the voltage in the power distribution network between two different times. One of the one or more operating parameters of the voltage regulation device may include a time delay that defines a time period during which the voltage regulation device does not perform a voltage regulation operation and after which the voltage regulation performs the voltage regulation operation, the voltage regulation operation being an operation performed by the voltage regulation device to adjust the voltage in the electrical power distribution network, the time delay is associated with a counter, and the control system may be configured to change a value of the counter by amount that is based on the determined metric related to the time rate of change of the voltage. The control system may be configured to change the value of the counter by an amount that is: a default incremental value if the determined metric related to the time rate of change is zero, more than the default incremental value if the determined metric related to the time rate of change is greater than zero, and less than the default incremental value if the determined metric related to the time rate of change is less than zero.

In some implementations, the one or more operating parameters of the voltage regulation device include the voltage range, a set voltage, and a time delay, and the control system is configured to change any of the voltage range, the set voltage, and a value of a counter associated with the time delay based on the determined metric related to the time rate of change. The set voltage is a voltage within the voltage range and, in operational use, the voltage regulation device is configured to maintain the voltage of the portion of the electrical power distribution network at the set voltage. The time delay defines a time period during which the voltage regulation device does not perform a voltage regulation operation and after which the voltage regulation performs a voltage regulation operation, the voltage regulation operation being an operation performed by the voltage regulation device to adjust the voltage in the electrical power distribution network.

The voltage regulation device may be a load tap changer that includes a plurality of taps and a tap selecting device, with the load tap changer having an output voltage that is controllable by positioning the tap selecting device on a particular tap or set of taps. In these implementations, the voltage regulation operation includes positioning the tap selecting device to control the output voltage of the load tap changer.

The control system also may be configured to determine an updated value for one or more operating parameters based on the determined metric related to the rate of change of the voltage, and to determine an updated operating mode based on at least one of the updated values, and the controller may be configured to change the operating mode of the voltage regulation device based on the updated value for the one or more operating parameters.

In another general aspect, a voltage on a distribution path of an electrical power distribution network that receives electricity from one or more distributed energy resources is controlled. It is determined that a voltage on the distribution path is outside of a voltage range, a time rate of change of a voltage on a distribution path of the electrical power distribution network is determined from at least two voltage measurements, each of the at least two voltage measurements representing the voltage on the distribution path at a different time; a value of a counter associated with a time delay parameter of a voltage regulation device is incremented by an amount that is based on the determined time rate of change of the voltage on the distribution path; and it is determined whether the value of the counter is equal to or exceeds a maximum counter value. If the value of the counter is equal to or exceeds the maximum counter value and the voltage on the distribution path is outside of the voltage range, a command signal is provided to a voltage regulation device and the value of the counter is reset to an initial value. If the value of the counter is less than the maximum counter value, another the time rate of change of the voltage on the distribution path is determined.

Implementations may include one or more of the following features. The value of the counter may be incremented based on a sign of the determined time rate of change.

In another general aspect, a control system for use with a voltage regulation device includes: one or more electronic processors; and a computer-readable medium storing instructions that, when executed, cause the one or more electronic processors to: determine, from a voltage measurement obtained by the voltage regulation device, that a voltage on a distribution path is outside of a voltage range; determine a time rate of change of the voltage on the distribution path, the time rate of change being determined based on at least two samples of the voltage at the distribution path obtained at different times; and change at least one operating parameter and/or an operating mode of the voltage regulation device based on the determined rate of change of the voltage.

Implementations may include one or more of the following features. One of the one or more operating parameters of the voltage regulation device may be a time delay that defines a time period during which the voltage regulation device does not perform a voltage regulation operation and after which the voltage regulation performs the voltage regulation operation, the time delay may be associated with a counter, and the control system may be configured to change a value of the counter by amount that is based on the determined metric related to the time rate of change of the voltage.

The electronic storage also may store default values for at least one operating parameter and a default operating mode, the control system also may include an input/output interface configure to accept input from a user of the control system, and the instructions also may include instructions that, when executed, cause the one or more electronic processors to receive input from the input/output interface and to update the default value of the at least one operating parameter or the default operating mode.

Implementations of any of the techniques described herein may include a voltage regulation device, a system that includes a voltage regulation device and a control system configured to control the voltage regulation device, software stored on a non-transitory computer readable medium that, when executed, controls a voltage regulation device, a kit for retrofitting a voltage regulation device, and/or a method. The details of one or more implementations are set forth in the accompanying drawings and the description below. Other features will be apparent from the description and drawings, and from the claims.

DETAILED DESCRIPTION

Techniques for controlling a voltage regulation device in an electrical power system that receives electricity from one or more distributed energy resources are disclosed. As discussed below, the technique includes assessing the time rate of change of the voltage in the electrical power system instead of assessing only the voltage value to make more accurate decisions regarding whether and when to command the voltage regulation device to perform a voltage regulation operation.

Figure 1:
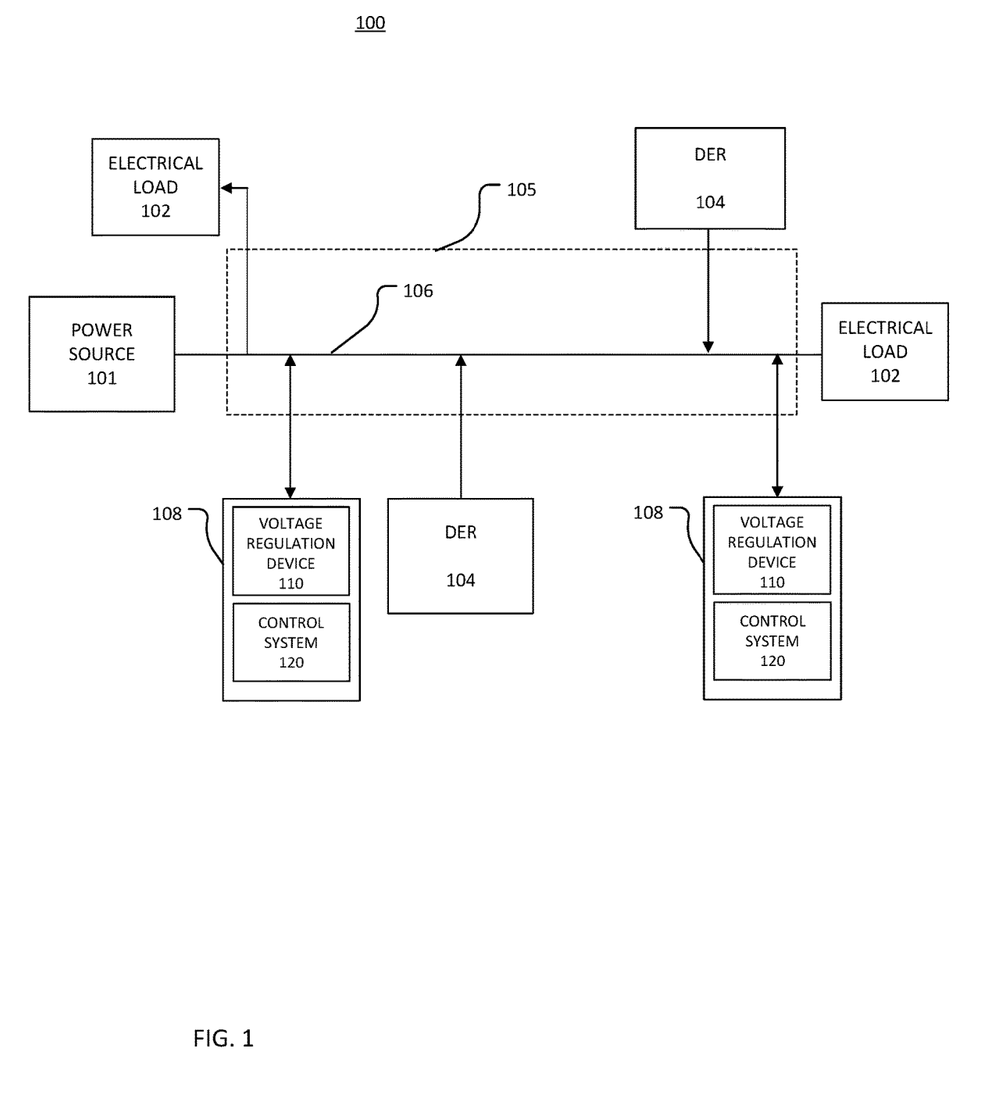
FIG. 1 is a block diagram of an example of an electrical power distribution system.

Referring to FIG. 1, a block diagram of an example of an electrical power system 100 is shown. The power system 100 includes an electrical power distribution network 105, which transfers electricity from power sources 101 (including distributed energy resources 104) to electrical loads 102 via a distribution path 106. The electrical power distribution network 105 may be, for example, an electrical grid, an electrical system, or a multi-phase electrical network that provides electricity to commercial and/or residential customers. The power distribution network 105 may have an operating voltage of, for example, at least 1 kilovolt (kV), up to 34.5 is kV, up to 38 kV, up to 69 kV, or 69 kV or higher. The power distribution network 105 may operate at a fundamental frequency of, for example, 50-60 Hertz (Hz). The distribution path 106 may include, for example, one or more distribution lines, electrical cables, wireless distribution paths, and/or any other mechanism for transmitting electricity.

The electrical loads 102 may be any device that utilizes electricity and may include electrical equipment that receives and transfers or distributes electricity to other equipment in the electrical power distribution network 105. The electrical loads 102 may include, for example, transformers, fuses, rechargeable batteries, electrical machinery in a manufacturing facility, and/or electrical appliances and systems in a residential building.

The power system 100 also includes voltage regulation systems 108. The voltage regulation systems 108 include a voltage regulation device 110 and a control system 120, which controls the voltage regulation device 110 to maintain the voltage on the distribution path 106 within a voltage range even under conditions in which the amount of electricity generated by the DERs varies. The control system 120 determines a time rate of change of the voltage on the distribution path 106 and determines whether and how to control the voltage regulation device 110 based on the determined time rate of change. High changes in voltage over a relatively short duration of time indicate that the variation of the voltage on the distribution path 106 may be a temporary voltage fluctuation caused by a DER.

The power source 101 may be any source of electricity such as, for example, a power plant that generates electricity from fossil fuel or from thermal energy or an electrical substation. More than one power source may supply electricity to the electrical distribution network 105, and more than one type of power source may supply electricity to the electrical distribution network 105. The power sources 101 of the electrical power distribution network 105 include the distributed energy resources 104. A distributed energy resource (DER) is any type of source of electricity in which the amount of generated electricity varies dramatically over a period of time during which the DER would nominally be expected to produce a relatively constant amount of electricity. For example, the DER may be a solar energy system that includes an array of photovoltaic (PV) devices that convert sunlight into electricity. The amount of electricity generated by the solar energy system is expected to be fairly constant during a sunny day. However, the amount of generated electricity may drop quickly when a cloud comes between the PV device and the sun and the amount of generated electricity may rise quickly a short time later when the cloud moves away and is no longer between the PV device and the sun. In other example, the DER may be a wind-based energy system, such as a wind turbine or a wind farm.

The voltage regulation systems 108 monitor and control the amount of voltage in the power distribution network 105. For example, the voltage regulation systems 108 may be used to maintain a steady-state voltage of the electrical power distribution network 105, or of a portion of the network 105, within a voltage range such that the voltage level at the electrical equipment 102 also stays within an acceptable range. Each voltage regulation system 108 may be any type of electrical, mechanical, or electro-mechanical device that is capable of performing a voltage regulation operation that changes the voltage on the distribution path 106 without interrupting electrical service to the connected electrical loads 102. The voltage regulation system 108 may be, for example, a load-tap changer, a line voltage regulator, or a switched capacitor. The voltage regulation operation may be any action that the voltage regulation system 108 is capable of performing to change the voltage on the distribution path 106. The lifetime of the voltage regulation system 108 may be measured by the number of voltage regulation operations that the system 108 is expected to be able to perform without needed to be replaced and/or repaired.

Because the electrical power produced by distributed energy resources 104 may vary greatly over a relatively short about of time and may vary in ways that are unpredictable, using electricity generated by the DER 104 may cause the voltage regulation systems 108 to perform voltage regulation operations more frequently as compared to a configuration in which DERs are not used as sources of electricity. Although the voltage regulation system 108 may be capable of performing the voltage regulation operations with sufficient frequency and accuracy to maintain the voltage level of the distribution path 106 within the voltage range despite variations in the amount of supplied electricity caused by the DERs 104, using the voltage regulation system 108 to such an extent may result in having to replace or repair the voltage regulation system 108 more quickly than expected.

Figure 3:
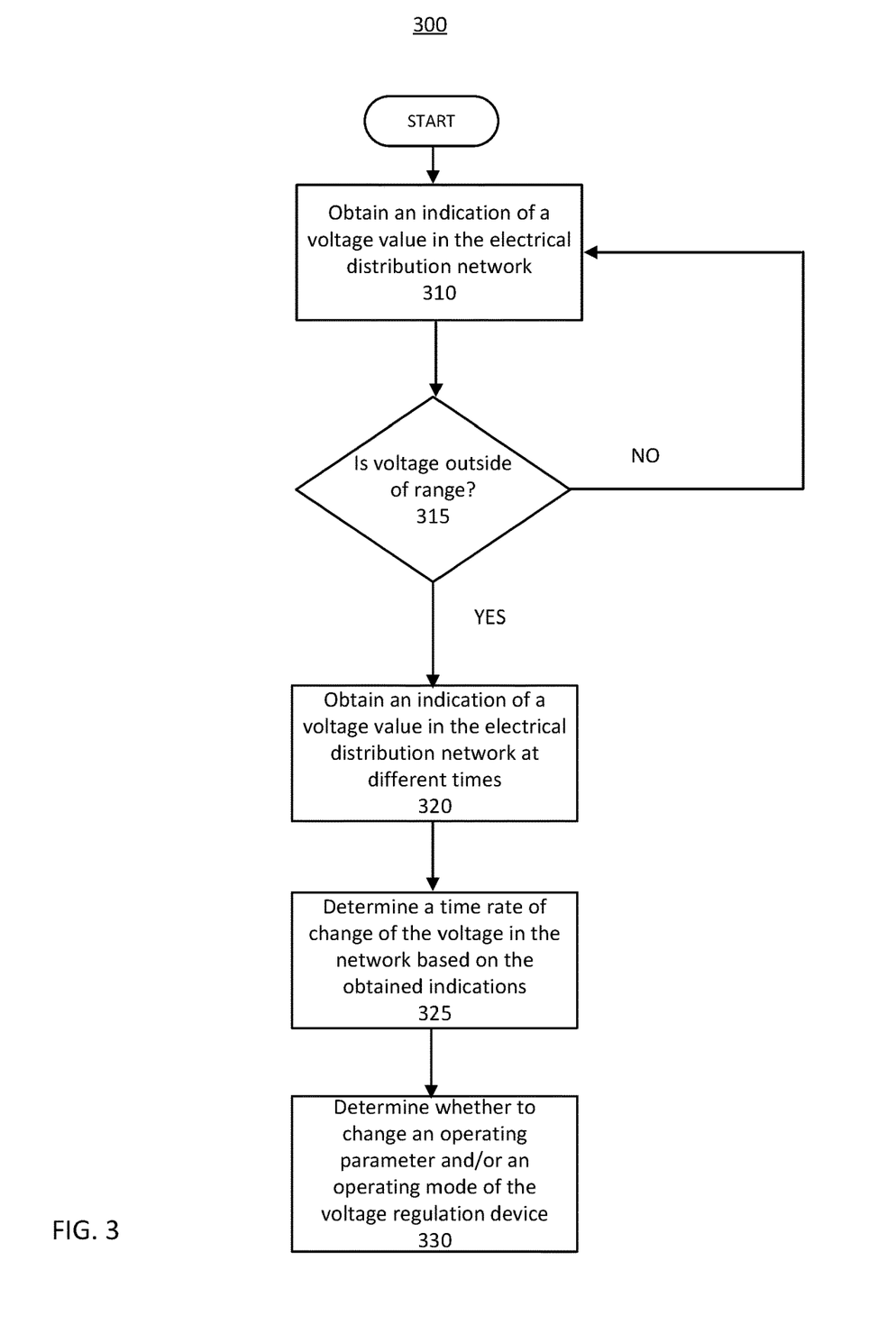
FIG. 3 is a flow chart of an example of a process for controlling a voltage regulation device.
Figure 4:
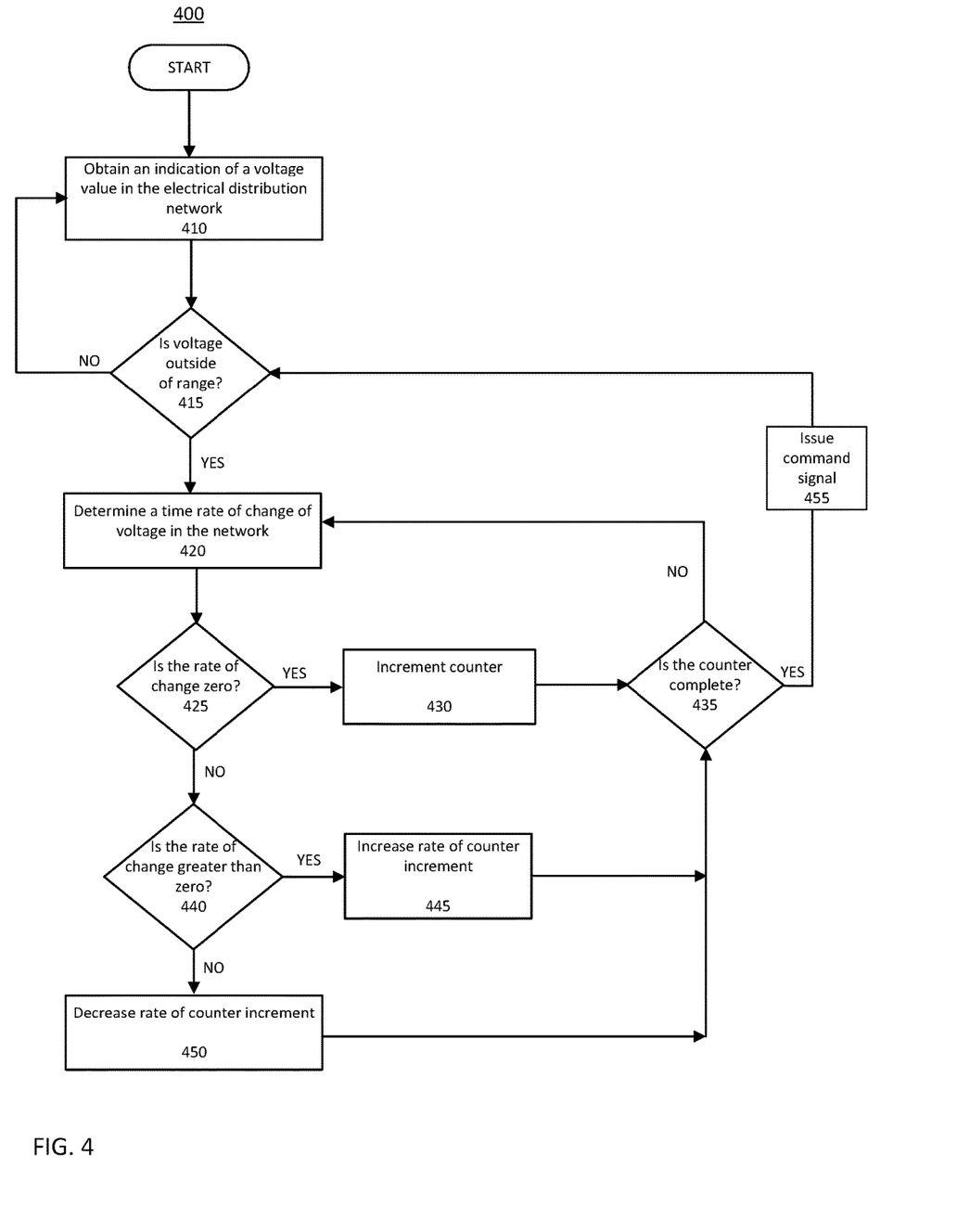
FIG. 4 is a flow chart of an example of a process for using a time rate of change of voltage on a distribution path to control a voltage regulation device.
Figure 6:
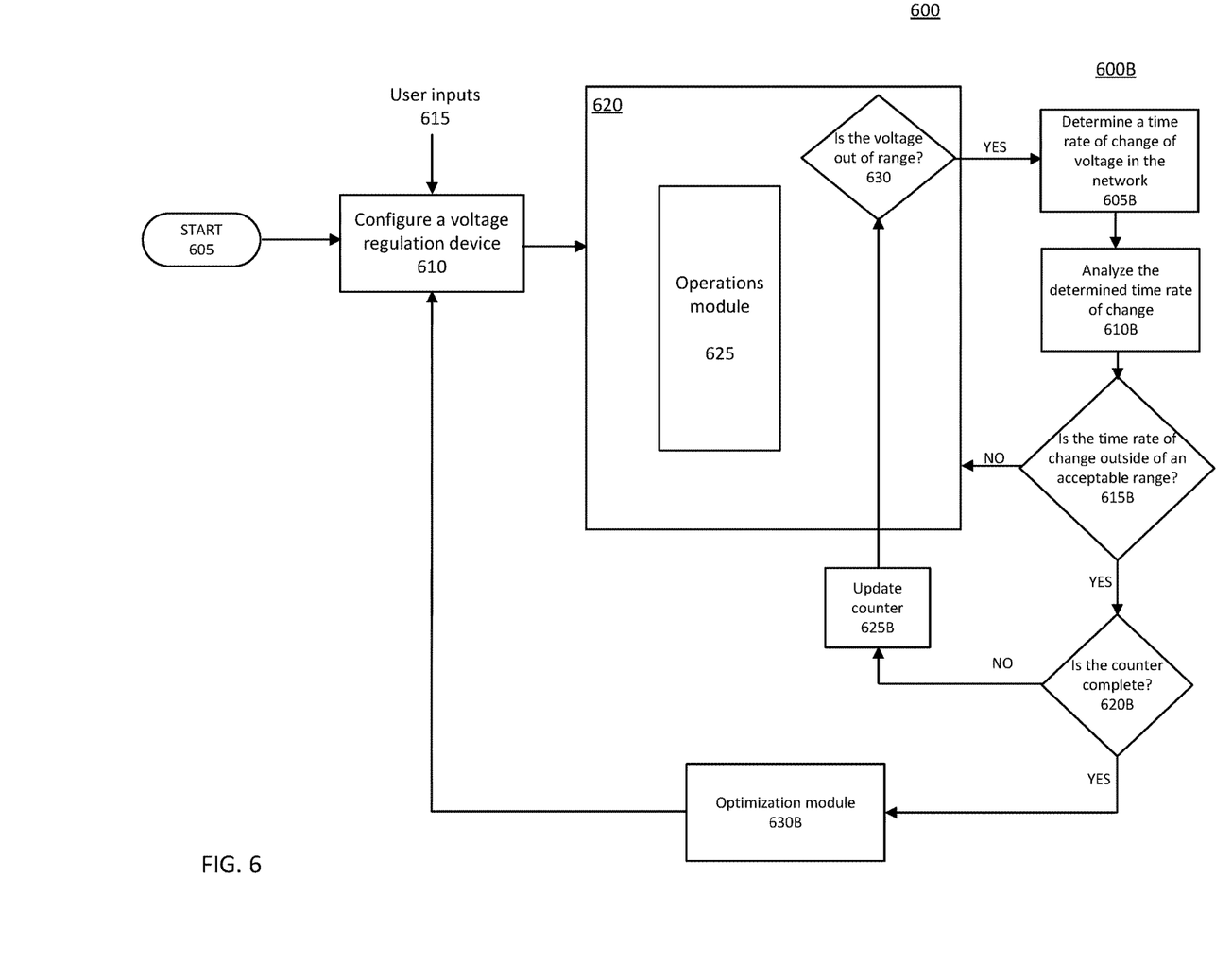
FIG. 6 is a flow chart of another example of a process for controlling a voltage regulation device.

Thus, it is desirable to control the operating parameters and/or the operating mode of the voltage regulation system 108 such that the voltage in the network 105 is maintained within an acceptable range of voltages while also reducing or minimizing the number of voltage regulation operations performed by the voltage regulation systems 108. FIGS. 3, 4, and 6 provide examples of processes that may be used to control a voltage regulation device in an electrical power distribution network that uses electricity from one or more DERs. Example implementations of the voltage regulation system 108 are discussed before discussing the examples of processes to control the voltage regulation device.

Figure 2A:
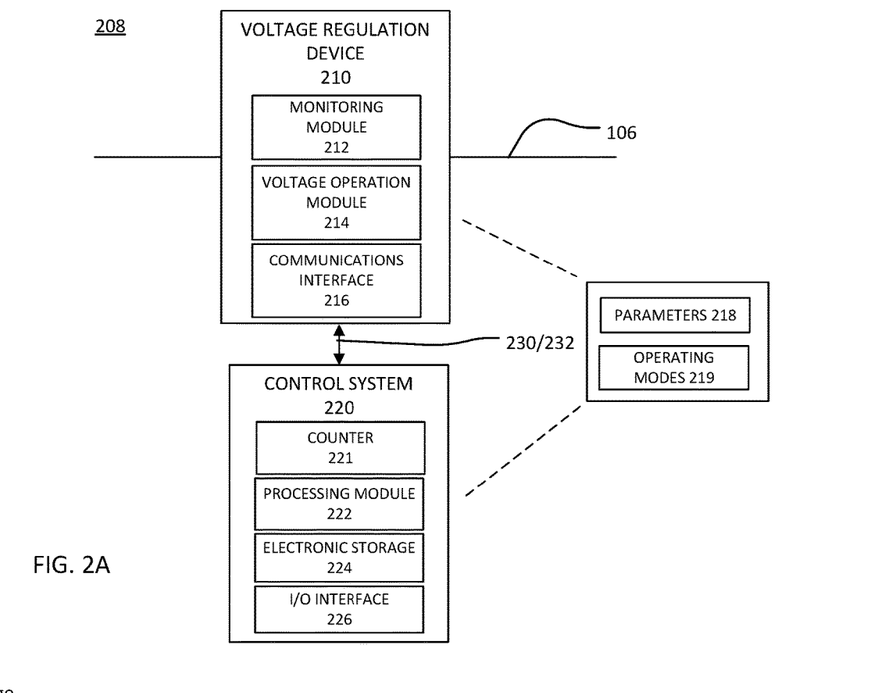
FIG. 2A is a block diagram of an example of a voltage regulation system that includes a voltage regulation device and a control system.

FIG. 2A is a block diagram of a voltage regulation system 208. The voltage regulation system 208 may be used as any of the voltage regulation systems 108 in the electrical power distribution network 105 of FIG. 1. The voltage regulation system 208 monitors and controls the voltage level on the distribution path 106. The voltage regulation system 208 includes a voltage regulation device 210 and a control system 220 that controls the operation of the voltage regulation device 210. The voltage regulation device 210 is associated with operating parameters 218 and operating modes 219. The operating parameters 218 are settings, values, or metrics that define the conditions of operation of the voltage regulation device 210. The operating modes 219 define how the voltage regulation device 210 responds when the voltage on the distribution path 106 is outside of a defined voltage range.

The voltage regulation device 210 includes a monitoring module 212, a voltage operation module 214, and a communications interface 216. The monitoring module 212 monitors the voltage on the distribution path 106. For example, the monitoring module 212 may include a voltage meter, current meter, or other device that is capable of measuring the voltage on the distribution path 106 or providing data from which the voltage on the distribution path 106 may be derived. The monitoring module 212 may be associated with a sampling rate that indicates how often the monitoring module 212 obtains or receives an indication of the voltage on the distribution path 106. The voltage operation module 214 acts to change the output voltage of the voltage regulation device 210 to thereby change voltage on the distribution path 106. The communications interface 216 connects to a control cable 230 and enables data to be sent from the voltage regulation device 210 to the control system 220. For example, the communications interface 216 may send voltage measurements collected or received by the monitoring module 212 to the control system 220.

The control system 220 generates a command signal 232 and provides the command signal 232 to the communications interface 216 via the control cable 230. The command signal 232 may include data sufficient to cause the voltage operation module 214 to perform an operation to change the voltage level on the distribution path 106, to change a setting of the operating parameters 218, and/or to change an operating mode of the voltage regulation device 210. The command signal 232 may be generated based on information received from the monitoring module 212 of the voltage regulation device 210. Examples of how the control system 220 controls the voltage regulation device are discussed with respect to FIGS. 3, 4, and 6.

The control cable 230 may be any type of cable capable of transferring data between the voltage regulation device 210 and the control system 220. The control cable 230 may be a wired (physical) cable, a wireless connection, or a combination of wired and wireless connections. Moreover, although the voltage regulation device 210 and the control system 220 are shown as being separate system that are connected by the control cable 230, in other implementations, the control system 220 and the voltage regulation device 210 may be housed together in a single housing or unit or otherwise integrated in a single device.

The control system 220 includes a counter 221, an electronic processing module 222, an electronic storage 224, and an input/output (I/O) interface 226. The counter 221 may be implemented as a set of instructions and stored on the electronic storage 224. The electronic processing module 222 includes one or more electronic processors. The electronic processors of the module 222 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 224 may be any type of electronic memory that is capable of storing data, and the electronic storage 224 may include volatile and/or non-volatile components. The electronic storage 224 and the processing module 222 are coupled such that the processing module 222 may access or read data from the electronic storage 224 and may write data to the electronic storage 224. The electronic storage 224 may store default values for the operating parameters and a default operating mode.

The I/O interface 226 may be any interface that allows a human operator and/or an autonomous process to interact with the control system 220. The I/O interface 226 may include, for example, a display, a keyboard, audio input and/or output (such as speakers and/or a microphone), a serial or parallel port, a Universal Serial Bus (USB) connection, and/or any type of network interface, such as, for example, Ethernet. The I/O interface 226 also may allow communication without physical contact through, for example, an 802.11, Bluetooth, or a near-field communication (NFC) connection. The control system 220 may be, for example, operated, configured, modified, or updated through the I/O interface 226.

The I/O interface 226 also may allow the control system 230 to communicate with systems external to and remote from the system 208, For example, the I/O interface 226 may include a communications interface that allows communication between the control system 22.0 and a remote station (not shown), or between the control system 220 and an electrical apparatus other than the voltage regulation device 210, through the I/O interface 226 using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the control system 220 without making physical contact with the control system 220. For example, the remote station may be a computer-based work station, a smart phone, tablet, or a laptop computer that connects to the control system 220 via a services protocol, or a remote control that connects to the control system 220 via a radio-frequency signal.

Information related to the operating parameters 218 and operating modes 219 may be stored on the electronic storage 224 of the control system 210, at a remote station (not shown), and/or on the voltage regulation device 210. Moreover, the operating parameters 218 and the operating modes 219 may be changed during operational use of the voltage regulation system 208 by an end user. For example, in implementations in which information defining the operating parameters 218 and the operating modes 219 is stored on the electronic storage 224, the values associated with the operating parameters 218 and 219 may be changed through the I/O interface 226. Additionally the operating parameters 218 and the operating mode may be changed by an automated process such as the processes 300, 400, and/or 600 discussed below.

Figure 2B:
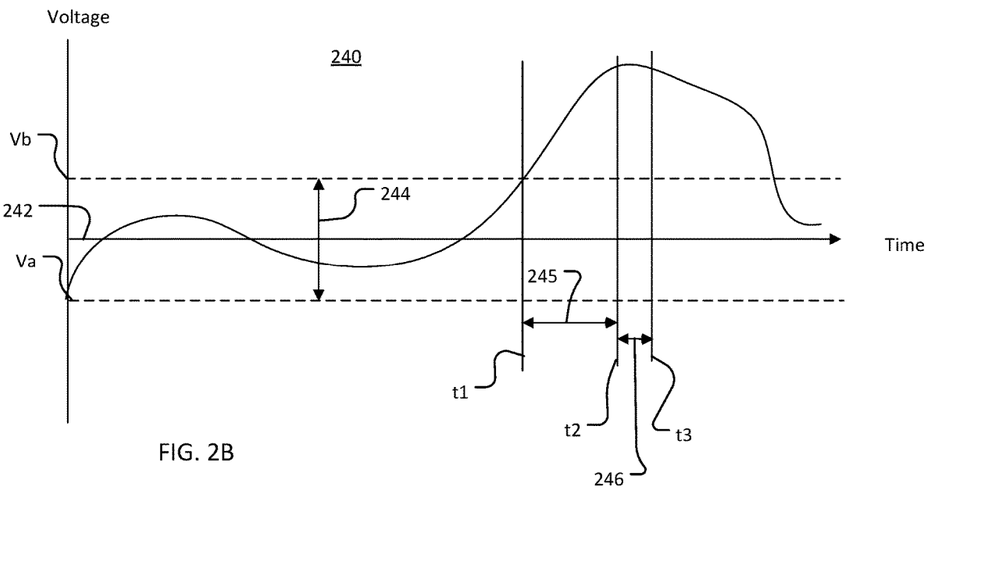
FIG. 2B is a plot of an example of voltage as a function of time at a distribution path in an electrical power distribution system.

FIG. 2B is a plot 240 that shows an example of voltage on the distribution path 106 as a function of time. The plot 240 also provides an introduction to three example operating parameters 218 of the voltage regulation device 210: a set voltage 242, a voltage range (or voltage bandwidth) 244, and a time delay 245. As discussed with respect to FIGS. 3, 4, 5B-5D, and 6, the control system 220 determines a time rate of change of the voltage level of the distribution path 106 and adjusts any or all of the operating parameters 218 and/or the operating mode 219 based on the time rate of change to optimize the performance of the voltage regulation system 208.

The set voltage 242 is the voltage that the voltage regulation system 208 seeks to maintain on the path 106. The set voltage 242 may be, for example, 120V or 240V. Although the voltage regulation system 208 seeks to maintain the voltage level on the distribution path 106 at the set voltage 242, a voltage level that is not the set voltage 242 but is within a range of voltages 244 (or a voltage bandwidth 244) is also acceptable. The voltage range 244 is a continuous range of voltages about the set voltage 242 that are acceptable for proper operation of the loads 102. The voltage range 244 has a maximum voltage of Vb and a minimum voltage of Va, and the set voltage 242 may be in the center of the voltage range 244. The difference between Vb and Va may be, for example, 1 to 3 V. For an implementation in which the set voltage 242 is 120 V and the voltage rage 244 spans 2 V, Vb is 121 V and Va is 119 V. In some implementations, Va and Vb are part of the parameters 218 and may be changed during operational use of the voltage regulation system 208.

The voltage on the distribution path 106 is outside of the voltage range 244 when the voltage on the distribution path 106 is greater than Vb or less than Va. When the voltage on the distribution path 106 is outside of the voltage range 244, the voltage regulation device 210 performs a voltage regulation operation after the expiration of a time delay 245. The time delay 245 may be, for example, between 30 and 60 seconds. The time delay 245 is a period of time that the control system 220 waits before issuing a command signal 232 that causes the voltage regulation device 210 to perform a voltage regulation operation. During the delay time 245, the voltage regulation device 210 is in a "time delay state" and does not perform a voltage regulation operation. The time delay 245 is associated with a counter 221 that is incremented and/or decremented by an increment amount (Tcnt) until the counter 221 expires or reaches the end of the time delay 245. The increment amount (Tcnt) also may be a parameter 218 of the voltage regulation device 210. As discussed with respect to FIG. 4, the increment amount (Tcnt) may vary throughout the time delay state. When the counter 221 expires, the control system 220 issues a command signal 232 to the voltage regulation device 210, and the voltage regulation device 210 performs a voltage regulation operation based on the command signal 232. In the example of FIG. 213, the voltage on the distribution path 106 moves out of the range 244 at a time t1, and the time delay 245 begins at the time t1. The counter 221 expires at the time t2. At the time t2, the control system 220 issues the command signal 232 such that the voltage is regulation device 210 performs the voltage regulation operation.

Figure 2C:
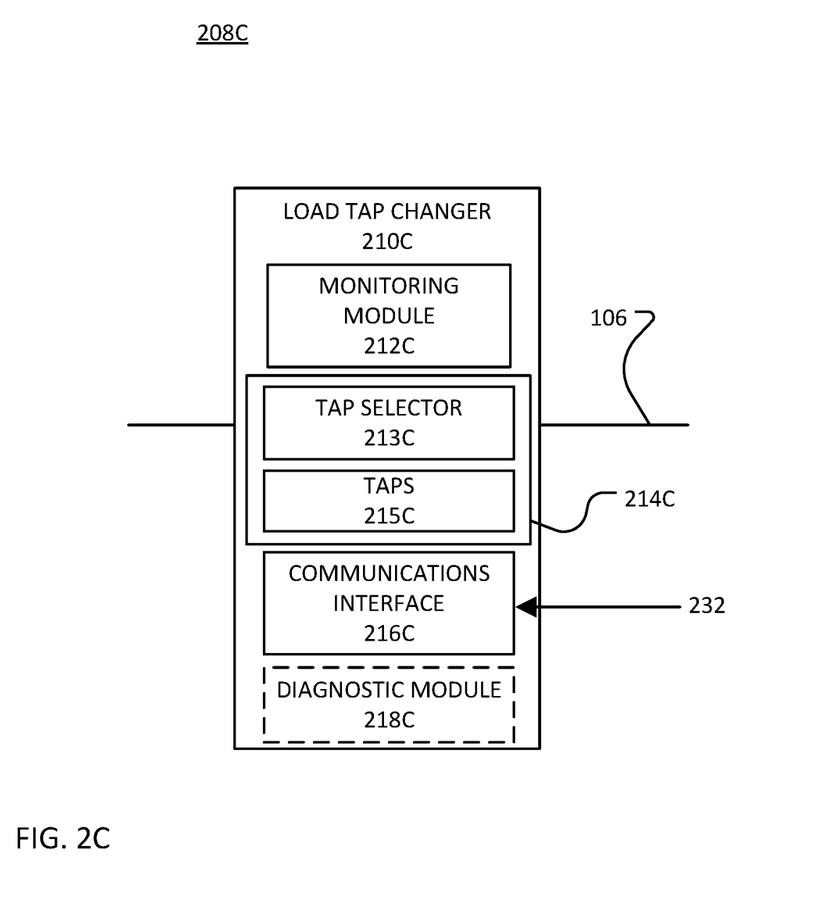
FIG. 2C is a block diagram of an example of a load tap changer.

Referring also to FIG. 2C, a block diagram of a load tap changer 210C is shown. The load tap changer 210C is an example of an implementation of the voltage regulation device 210, and the load tap changer 210C may be used with the control system 220. The load tap changer 210C is a voltage regulator that monitors and controls the voltage level at the distribution path 106 such that the voltage delivered to the electrical loads 102 (FIG. 1) is maintained within the voltage range 244 despite changes in the load on the distribution path 106 and/or changes in the amount of electricity supplied by DERs 104 (FIG. 1).

The load tap changer 210C includes a monitoring module 212C, a tap selector 213C, taps 215C, and a communications interface 216C, which provides data to and receives the command signal 232 from the control system 220 via the control cable 230. The monitoring module 212C may be any type of device capable of measuring or determining the voltage on the distribution path 106. Together, the tap 215C and the tap selector 213C form a voltage regulation operation module 214C for the load tap changer 210C. The tap 215C may be a device, such as a coil or transformer, that has a variable voltage that is controllable by the location of a tap on the coil. The location of the tap 215C is varied by the tap selector 213C to control the voltage on the distribution path 106. The tap selector 214 may include, for example, motors, mechanical linkages, and/or electronic circuitry to move the tap and control the voltage. Thus, varying the location of the tap 215C by controlling the tap selector 213C is a voltage regulation operation for the load tap changer 210C.

The load tap changer 210C also may include a diagnostic module 218C. The diagnostic module 218C measures or extracts environmental information and/or diagnostic information. For example, the diagnostic module 218C may measure environmental information, such as temperature, humidity, air quality, and/or air pressure in the vicinity of the load tap changer 210C. In these implementations, the diagnostic module 218C may include one or more environmental sensors such as, for example, a thermometer, a moisture monitor, a barometer, or any other environmental sensor. The diagnostic module 218C also may include one or more diagnostic sensors or measurement devices such as a health monitor, a monitor that tracks the total time in which the load tap changer 210C has been deployed, and/or a monitor that tracks the number of times the load tap changer 210C has performed a voltage regulation operation.

The load tap changer 210C is associated with the operating parameters 218, including the set voltage 242, the voltage range (or bandwidth) 244, and the time delay 245. Additionally, the load tap changer 210C is associated with the modes of operation 219 and has at least three modes of operation: (1) sequential mode, (2) time-integrating mode, and (3) voltage averaging mode. In the sequential mode, the voltage on the distribution path 106 is sampled by the monitoring module 212 while the voltage regulation device 210C is in the time delay state. In other words, after the voltage on the distribution path 106 is determined to be outside of the voltage range 244, the monitoring module 212 continues to sample the voltage on the distribution path 106. The monitoring module 212 may obtain a reading of the voltage on the distribution path 106 more than one time per second. If the voltage on the distribution path 106 returns to within the voltage range 244 during the time delay, the counter 221 is reset. If the voltage on the distribution path 106 remains outside of the voltage range 244 for the remainder of the time delay, the counter 221 expires and the control system 220 issues the command signal 232 such that the load tap changer 210C performs the voltage regulation operation by moving the tap 215C to a different location. The control system 220 also may issue subsequent command signals 232 such that the load tap changer 210C performs additional tap changes to bring the voltage on the distribution path 106 into the voltage range. The subsequent tap changes may use a time delay that is shorter than the time delay 245, which is associated with the initial tap. Referring again to FIG. 2B, the time delay associated with the initial tap is the time delay 245, and the time delay associated with a subsequent tap is the time delay 246.

In the time-integrating mode, when the voltage on the distribution path 106 goes out of the voltage range, the counter 221 is initiated and incremented until the time delay is reached. If the voltage on the distribution path 106 returns to be within the voltage range before the counter 221 reaches the time delay, the timer is decremented.

In the voltage averaging mode, when the voltage on the distribution path 106 is outside of the voltage range, the monitoring module 212C continues to sample the voltage on the distribution path 106 during the time delay. Each sample may be obtained at a different time. The control system 220 averages the voltages over the entire time delay period. The control system 220 then computes the number of taps needed to bring the average voltage to the set voltage. The control system 220 generates a command signal 232 based on the determined number of taps and provides the command signal 232 to the load tap changer 210C, which performs the voltage regulation operation by changing the location of the tap 215C in accordance with the command signal 232.

FIG. 3 is a flow chart of an example of a process 300 for controlling a voltage regulation device. The process 300 may be performed by one of more electronic processors of the processing module 222 of the control system 220. The process 300 is discussed with respect to the control system 220 (FIG. 2A), the load tap changer 210C (FIG. 2C), and the power system 100 (FIG. 1). However, the process 300 may be performed by other control systems and other voltage regulation devices.

An indication of a voltage value in the distribution path 106 is obtained (310). The indication of the voltage value may be a voltage at the distribution path 106 measured by the monitoring module 212C. The indication of the voltage value is compared to the voltage range 244 (315). If the indication of the voltage value is not outside of the voltage range 244, then the process 300 returns to (310). If the voltage value is outside of the voltage range 244, then another indication of a voltage value in the distribution path 106 is obtained at a different time (320). At least two voltage values are obtained, each being at a different time. A metric related to a time rate of change of the voltage level in the distribution path 106 is determined based on the two or more indications of the voltage values (325). For example, the metric related to the time rate of change may be an estimate of the time rate of change of the voltage at the distribution path 106 and may be determined using Equation 1:

$$\frac{dv}{dt} = \frac{V2 - V1}{t2 - t1}, \qquad \text{Equation 1}$$

where $V_2$ is an indication of a voltage value at the distribution path 106 at a time t2, and V1 is an indication of a voltage value at the distribution path 106 at a time t1, with the time t1 occurring before the time t2 such that (t2−t1) is a positive value. In some implementations, the metric related to the time rate of change may be based on more than two samples of the voltage. Using additional samples of the voltage may result in a more accurate estimate of the time rate of change. Moreover, information other than the time rate of change of the voltage may be used, as discussed with respect to FIG. 6. The control system 220 determines whether or not to change an operating parameter and/or an operating mode of the load tap changer 210C based on the time rate of change (330). For example, the control system 22.0 may determine to how to increment the counter 221 based on the sign of the time rate of change.

FIG. 4 is a flow chart of an example process 400 for using the time rate of change of voltage in the distribution path 106 to control a voltage regulation device. In particular, the process 400 controls the manner in which the counter 221 is incremented. The process 400 may be performed by one of more electronic processors of the processing module 222 of the control system 220. The process 400 is discussed with respect to the control system 220 (FIG. 2A), the load tap changer 210C (FIG. 2C), and the power system 100 (FIG. 1). However, the process 400 may be performed by other control systems and other voltage regulation devices.

The elements (410) and (415) of the process 400 are similar to the elements (310) and (315), respectively, of the process 300 of FIG. 3. An indication of a voltage value in the distribution path 106 is obtained (410). The indication of the voltage value may be a voltage measured by the monitoring module 212C at the distribution path 106. The indication of the voltage value is compared to the voltage range (415). If the voltage value is within the voltage range 244, the process 400 returns to (410) or may end if no additional monitoring is desired.

If the indication of the voltage value is outside of the voltage range 244, then another indication of a voltage value in the distribution path 106 is obtained at a different time, and the time rate of change of the voltage (delta_V) on the distribution path 106 is determined from Equation 1 (420). The delta_V is analyzed to determine how to increment the counter 221.

As discussed above, the voltage regulation device 210C is associated with several operating parameters 218, including the time delay 245. The time delay 245 may be a fixed value that is stored in the electronic storage 224 of the control system 220 or on the voltage regulation device 210C. However, by using the process 400 the amount of time that the voltage regulation device 210C is actually in the time delay state waiting to be commanded to perform a voltage regulation operation may vary due to the manner in which the process 400 increments the counter 221. Each time the delta_V is determined, the counter 221 is assessed and changed by the counter amount (Tcnt). If the counter amount (Tcnt) was always the same, the counter 221 would be incremented by the same amount each time the delta_V was determined, and the counter 221 would always expire in the same amount of time. However, the process 400 does not increment the counter 221 by the same amount each time the time rate of change is evaluated. Thus, the process 400 allows the voltage regulation device 210 to be kept in the time delay state for a longer or shorter amount of time than the nominal amount of time.

The delta_V determined in (420) is assessed to determine how to increment the counter 221. The value of the delta_V is compared to zero (425). If the delta_V is zero, then the voltage on the distribution path 106 is constant and the counter 221 is incremented by a default or standard amount (430). For example, the counter may be incremented by one (1) when delta_V is zero. If the delta_V is not zero, the delta_V is assessed further. If the delta_V is greater than zero (440), the rate at which the counter 221 is incremented is increased (445). For example, if the delta_V is greater than zero, the counter 221 may be increased by 2 instead of 1. Incrementing the counter 221 at a higher rate causes the counter 221 to expire sooner than if the counter 221 was incremented by the standard or typical amount. If the delta_V is less than zero, the rate at which the counter 221 is incremented is decreased (450) as compared to the standard amount. For example, if the delta_V is less than zero, the counter 221 may be incremented by −1 (that is, decremented by 1) incrementing the counter 221 at a slower rate causes the counter 221 to take longer to expire as compared to a situation in which the counter 221 is always incremented by the standard amount.

Thus, the counter 221 is incremented by an amount (Tcnt) that is determined by an assessment of the rate of change of the voltage on the distribution path 106. After the counter 221 is incremented, the counter is assessed to determine whether the counter is complete (435). If the counter is not complete, then the time rate of change of the voltage on the distribution path 106 is evaluated again (420) and the newly determined time rate of change of the voltage is assessed at (425) and/or (440). If the counter 221 is complete, the command signal 232 is issued to the voltage regulation device (455) to cause the voltage regulation device to perform a voltage regulation operation. For example, the command signal 232 may be issued to the load tap changer 208C to cause the tap selector 213C to move to another one of the taps 215C to thereby change the output voltage of the load tap changer 208C. After the voltage regulation operation is performed, the counter 221 is reset to an initial value (for example, 0).

FIGS. 5A-5D show simulated data of an example of using a process that varies the increment amount (such as the process 400) to regulate voltage on a distribution path. The data shown in FIGS. 5B-5D was generated by modeling a 3-phase voltage regulator on a consolidated feeder in an electrical power distribution system. The power distribution was modeled as having a PV DER. The intermittency or variation in the amount of electricity supplied by the PV DER was modeled as a noise source, with the amount of noise taken from actual measurements of electricity variation in a PV DER.

Figure 5A:
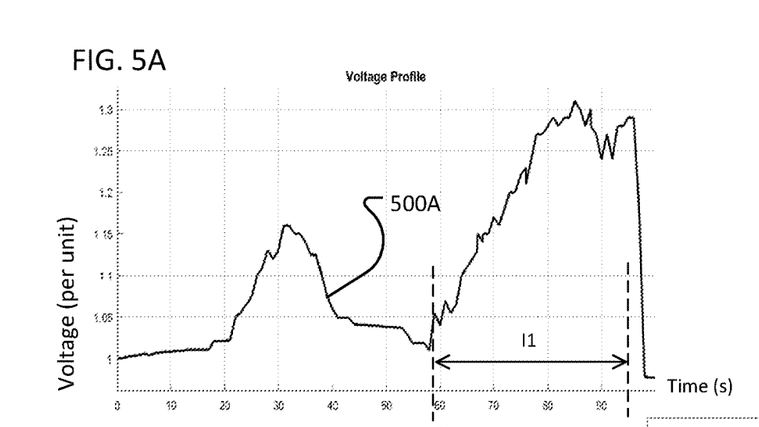
FIGS. 5A-5D show simulated data related to controlling a voltage regulation device.
Figure 5B:
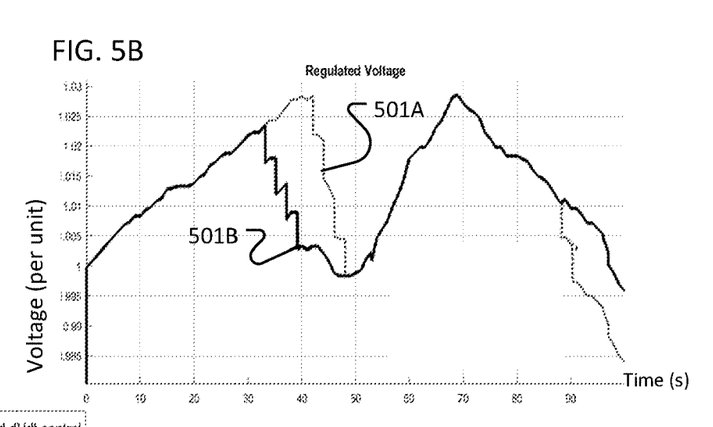
Figure 5C:
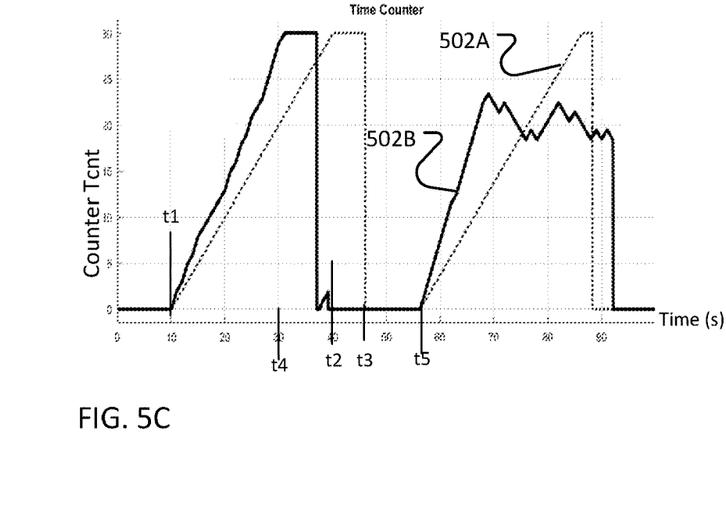
Figure 5D:
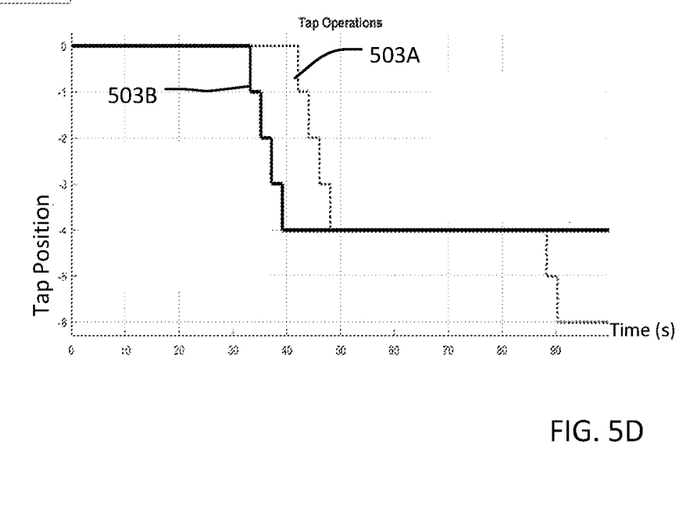

FIG. 5A shows a voltage profile 500A. The voltage profile 500A represents an unregulated voltage over time on the distribution path 106. In the example of FIG. 5A, the voltage profile 500A includes about 100 seconds (s) of voltage data, with the voltage values ranging from a minimum voltage of about 1 V at 0 seconds to a maximum voltage of about 1.3 V at around 85 seconds. FIG. 5B shows regulated voltage profiles 501A and 501B over the same time period as FIG. 5A. FIG. 5C shows traces 502A, 502B, both of which represent the value of the counter (Tcnt) over the same time period as FIG. 5A. FIG. 5D shows traces 503A, 503B, both of which represent the position of a tap selector of the voltage regulator over the same time period as FIG. 5A. In FIGS. 5B, 5C, and 5D, simulated data shown with the dotted line is from a control system implemented with a traditional voltage regulator and the solid line is from a control system implemented with a process such as the process 300 or 400.

The regulated voltage profile 501A was generated using a traditional technique for controlling the three-phase voltage regulator. The traditional technique was simulated using a control system based on Equation 2:

$$Tctr(t) = \begin{cases} \int_0^{Td} t; \left|V(t) - \frac{1}{2}Vbw\right| > Vset \\ 0; \left|V(t) - \frac{1}{2}Vbw\right| \leq Vset \end{cases}, \quad \text{Equation (2)}$$

where Tctr(t) is the value of the counter 221 at a time (t), V(t) is the voltage on the distribution path at a time (t), Td is the time delay 245, Vbw is the voltage range 244, and Vset is the set voltage 242. The counter has an initial value of 0 and the counter is triggered to count up during the time delay 245 by the voltage on the distribution path being outside of the range 244. As indicated by Equation 2, the value of the counter 221. is increased by a constant amount until Tcrt is equal to Td. The counter expires when Tcrt is equal to the time delay, Td. Equation (3) relates the counter value determined in Equation (2) to a tapping action of the voltage regulator:

$$TapR = \begin{cases} TapR - 1; V(t) > Vset + \frac{1}{2}VbwTctr > Td \\ TapR + 1 : V(t) > Vset - \frac{1}{2}VbwTctr > Td \end{cases}, \quad \text{Equation (3)}$$

where TapR is the current position of a tap selector in the voltage regulator. V(t) is greater than Vb (outside of the upper bound of the voltage range 244) and the counter has expired, the voltage regulator taps down to decrease the voltage on the distribution path 106. If V(t) is less than Va (outside of the lower bound of the voltage range 244), the voltage regulator taps up to increase the voltage on the distribution path 106.

The simulated regulated voltage 501B was generated using a process in which the value of Tctr varies during the time delay depending on a determined time rate of change of the voltage on the distribution path, similar to the process 400 of FIG. 4. The simulated regulated voltage 501B was generated using a controller modeled based on Equations 4 and 5:

$$Tctr(t) = \begin{cases} \alpha \int_0^{Td} t; \left|V(t) - \frac{1}{2}Vbw\right| > Vset \\ 0; \left|V(t) - \frac{1}{2}Vbw\right| \le Vset \end{cases}, \quad \text{Equation (4)}$$

where α is a counter increment parameter that is used to vary Tctr during the delay period. In the example of FIGS. 5B-5D, the value of the counter increment parameter a was varied based on Equation 5:

$$\alpha = \begin{cases} 2; \frac{dv}{dt} > 0 \\ 1; \frac{dv}{dt} = 0 \\ -1; \frac{dv}{dt} < 0 \end{cases}, \quad \text{Equation (5)}$$

where dv/dt is the time rate of change of the voltage on the distribution path at time (t). Other values may be used for the counter increment parameter (α).

Thus, the regulated voltage 501B is based on a process that determines how to increment the counter 221 by evaluating the amount and sign of the time rate of change of the voltage on the distribution path 106 instead of the voltage level alone. The counter 221 expires more quickly than the traditional approach when the rate of change of the voltage is greater than zero. A rate of change of voltage greater than zero indicates that the voltage is ramping away from the set point 242. By causing the counter 221 to expire relatively quickly, the voltage regulator will issue a tap more quickly and thus act to correct a voltage deviation on the distribution path. The counter 221 expires more slowly than the traditional approach when the rate of change of the voltage is less than zero. When the rate of change of the voltage is less than zero, the voltage on the distribution path is ramping toward the set voltage 242. Thus, a rate of change of the voltage that is less than zero may indicate that the deviation of the voltage on the distribution path is temporary and a tap is not needed. By causing the counter 221 to expire more slowly, the control system is able to delay the voltage regulator from making a tap. If the rate of change of the voltage is zero, the counter 221 is incremented in the same manner as with the traditional approach.

Referring to FIGS. 5A and 5C, at time t1, the voltage 500A exceeds the upper bound of the voltage range 244 and the counter 221 (which is initially has a value of 0) begins to be incremented. FIG. 5C shows the value of the counter 221 throughout the 100 second duration of the simulation. The dotted trace 502A shows the value of the counter 221 as a function of time for a controller implemented using the traditional approach, and the solid trace 502B shows the value of the counter 221 as a function of time for a controller implemented using a process such as the process 400 or based on Equations 4 and 5. The trace 502A increases monotonically from t1 to t2, and the counter 221 expires at t2 for the traditional implementation. As shown in trace 503A FIG. 5D, the voltage regulator taps down shortly after t2.

The counter 221 is also incremented beginning at t1 for the time rate of change approach. However, the trace 502B does not have a constant slope because the value of Tcnt varies based on the value of the rate of change of the voltage. The counter 221 expires at a time t4, which is before t2. Thus, the counter 221 expires more quickly for the rate of change approach than the traditional approach. In the example shown, the counter 221 expires about 10 seconds earlier for the rate of change approach. As shown in the trace 503B of FIG. 5D, the rate of change approach results in the voltage regulator tapping down at an earlier time than the traditional approach. As shown in FIG. 5B, this results in improved voltage regulation. The counter 221 is reset to 0 after the voltage regulator taps down.

Referring again to FIGS. 5A and 5C, during a time interval I1, the voltage on the distribution path 106 increases but also fluctuates. The fluctuation indicates that the increase in voltage during the interval I1 may be caused by a temporary change in the voltage on the distribution path such as a temporary drop in the amount of electricity supplied by a DER. The voltage 500A is outside the range 244 at the time t5. Thus, the counter 221 is incremented beginning at the time t5. The trace 502A (based on Equation 2) again has a constantly increasing slope because the counter is incremented by a constant amount. The trace 502B (based on Equations 3 and 4) leaves the voltage regulator in the time delay state longer because the rate of change of voltage is positive and negative during interval I1. As shown by trace 503B in FIG. 5D, the voltage regulator does not perform a tap but, as shown in FIG. 5B, the voltage is sufficiently regulated. Thus, the controller based on Equations 3 and 4 is able recognize that the voltage increase during the second interval is due to an intermittency and avoids an unnecessary tap while maintaining the voltage on the path 106.

Referring to FIG. 6, a flow chart of another example of a process 600 for controlling a voltage regulation device is shown. The process 600 may be performed by one of more electronic processors of the processing module 222 of the control system 220. The process 600 is discussed with respect to the control system 220 (FIG. 2A), the voltage regulation device 210 (FIG. 2A), and the power system 100 (FIG. 1). However, the process 600 may be performed by other control systems and other voltage regulation devices.

The process 600 works with a subprocess 600B that monitors the time rate of change of the voltage on the distribution path 106 and optimizes the operating mode 219 and/or the operating parameters 218 of the voltage regulation device 210 based on the observed time rate of change.

The process 600 begins (605), and the voltage regulation device 210 is configured (610). The voltage regulation device 210 is configured based on the operating parameters 218 and the operating mode 219. The initial configuration of the voltage regulation device 210 may be a default configuration with a default operating mode and default values for the operating parameters 218. The default operating mode and/or default values of the operating parameters 218 may be selected by the manufacturer of the voltage regulation device 210. Additionally or alternatively, an end user may provide inputs 615 to configure the voltage regulation device 210 through the I/O interface 226. For example, the end user may specify values for all or some of the operating parameters 218 and/or may specify the operating mode 219.

The voltage regulation device 210 executes a protection and monitoring module 620 based on the operating mode specified by the configuration 610. The protection and monitoring module 620 operates the voltage regulation device 210 in accordance with the selected operating mode. The protection and monitoring module 620 includes an operations module 625, which is a collection of rules, algorithms, and/or logic, arranged, for example, as a computer program or a software module, that define how the voltage regulation device 210 operates in the selected operating mode. The operations module 625 monitors the voltage level at the distribution path 106. The protection and monitoring module 620 tests the monitored voltage level to determine whether the voltage on the distribution path 106 is outside of the voltage range 244 (630). If the voltage on the distribution path 106 is outside of the voltage range 244, then the subprocess 600B is performed.

The subprocess 600B begins by determining a time rate of change of the voltage at the distribution path 106 (605B). The time rate of change of the voltage at the distribution path 106 is determined based on Equation 1. The determined time rate of change of the voltage is analyzed (610B). For example, the sign of the time rate of change and/or the value of the time rate of change may be determined. The time rate of change is also compared to a range of acceptable rates of change (615B). For example, the range of acceptable rates of change may be a range centered about zero, or the range may include only 0. If the rate of change of the voltage is within the acceptable range, the subprocess 600B ends and the process 600 continues to execute the protection and monitoring module 620. If the rate of change of the voltage is outside of the acceptable range, the counter 221 is assessed to determine if the counter 221 has expired (620B). If the counter 221 has not expired, the counter 221 is updated (625B). The counter 221 may be updated by an amount that depends on the value of the rate of change of voltage determined in (605*b*). For example, the counter 221 may be updated based on Equations 4 and 5 discussed with respect to FIGS. 5B-5D. After the counter is updated, the subprocess 600B ends and the protection and monitoring module 620 continues to monitor the voltage on the distribution path 106 to determine whether the voltage is outside of the range 244 (630).

If the counter 221 is complete, the voltage regulation device 210 is commanded to perform a voltage regulation operation. Additionally, the completion of the counter 221 triggers an optimization module 630B that optimizes the operating parameters 218 and the operating mode 219 of the voltage regulation device 210. The optimization module 630B analyzes the rate of change of voltage over a finite number of samples (x) to determine the values of the operating parameters 218 that minimize the number of voltage regulation operations that are performed by the voltage regulation device 210 and reduces the amount of change in the regulated voltage. The number of samples (x) of the rate of change analyzed may be, for example, 15, and the samples may be obtained every 2 seconds. The end user may be able to set the number of samples that the optimization module 630B uses. The maximum number of voltage regulation operations and/or maximum the amount of change in the regulated voltage over a specified time period may be specified by the operating parameters 218 and/or by the user inputs 615. The optimization module 630B may compare the number of voltage regulations and the range of the regulated voltage over the samples to determine whether the present operating mode should be changed.

The optimization module 630B also uses the determined values of the operating parameters 218 to determine whether the present operating mode should be changed. For example, in some implementations, the optimization module 630B determines an optimal delay time 245. The difference between the determined optimal delay time and the current delay time may be analyzed to determine which operating mode is optimal for the conditions. In implementations in which the voltage regulation device 210 is the load tap changer 210C, if the optimized time delay is the same as the current time delay, the sequential mode may be selected as the optimal operating mode. If the optimized delay time is greater than the current delay time, the time integrated mode may be selected as the optimal operating mode. In another example, a change in the set voltage and a change in the delay time may help to adjust other operating parameters of the voltage averaging operating mode of a load tap changer.

The determined optimal values of the operating parameters and the optimal operating mode are provided to configure the voltage regulation device 210 (610). If the operation mode changed based on the subprocess 600B, the operations module 625 is changed to correspond with the new operating mode. For example, software configured to implement each operating mode of the voltage regulation device 210 may be stored on the electronic storage 224 and executed by the protection and monitoring module 620 in accordance with the operating mode specified by the end user and/or by the optimization module 630B.

Other features are within the scope of the claims.

What is claimed is:

1. A system for an electrical power distribution network that receives electricity from one or more distributed energy resources, the system comprising:
 a voltage regulation device configured to maintain a voltage in the electrical power distribution network within a range of voltages, the voltage regulation device comprising a voltage sampling module configured to obtain an indication of a voltage in the electrical power distribution network; and
 a control system coupled to the voltage regulation device, the control system configured to:
  determine a metric related to a time rate of change of the voltage in the power distribution network based on at least two samples of the voltage in the electrical power distribution network obtained at different times; and
  change at least one operating parameter and/or an operating mode of the voltage regulation device based on the determined rate of change of the voltage.

2. The system of claim 1, wherein the metric related to the time rate of change of the voltage in the power distribution network comprises an amount of change in the voltage in the power distribution network between two different times.

3. The system of claim 2, wherein
 one of the one or more operating parameters of the voltage regulation device comprises a time delay that defines a time period during which the voltage regulation device does not perform a voltage regulation operation and after which the voltage regulation performs the voltage regulation operation, the voltage regulation operation being an operation performed by the voltage regulation device to adjust the voltage in the electrical power distribution network, the time delay is associated with a counter, and the control system is configured to change a value of the counter by amount that is based on the determined metric related to the time rate of change of the voltage.

4. The system of claim 3, wherein control system is configured to change the value of the counter by an amount that is: a default incremental value if the determined metric related to the time rate of change is zero, more than the default incremental value if the determined metric related to the time rate of change is greater than zero, and less than the default incremental value if the determined metric related to the time rate of change is less than zero.

5. The system of claim 1, wherein the one or more operating parameters of the voltage regulation device comprise the voltage range, a set voltage, and a time delay, the set voltage is a voltage within the voltage range and, in operational use, the voltage regulation device is configured to maintain the voltage of the portion of the electrical power distribution network at the set voltage, the time delay defines a time period during which the voltage regulation device does not perform a voltage regulation operation and after which the voltage regulation performs a voltage regulation operation, the voltage regulation operation being an operation performed by the voltage regulation device to adjust the voltage in the electrical power distribution network, and the control system is configured to change any of the voltage range, the set voltage, and a value of a counter associated with the time delay based on the determined metric related to the time rate of change.

6. The system of claim 1, wherein the voltage regulation device comprises a load tap changer comprising a plurality of taps and a tap selecting device, the load tap changer having an output voltage that is controllable by positioning the tap selecting device on a particular tap or set of taps, and the voltage regulation operation comprises positioning the tap selecting device to control the output voltage of the load tap changer.

7. The system of claim 1, wherein the control system is further configured to determine an updated value for one or more operating parameters based on the determined metric related to the rate of change of the voltage, and to determine an updated operating mode based on at least one of the updated values, and the controller is configured to change the operating mode of the voltage regulation device based on the updated value for the one or more operating parameters.

8. A method of controlling a voltage on a distribution path of an electrical power distribution network that receives electricity from one or more distributed energy resources, the method comprising:

determining that a voltage on the distribution path is outside of a voltage range;

determining a time rate of change of a voltage on a distribution path of the electrical power distribution network from at least two voltage measurements, each of the at least two voltage measurements representing the voltage on the distribution path at a different time;

incrementing a value of a counter associated with a time delay parameter of a voltage regulation device by an amount that is based on the determined time rate of change of the voltage on the distribution path;

determining whether the value of the counter is equal to or exceeds a maximum counter value;

if the value of the counter is equal to or exceeds the maximum counter value and the voltage on the distribution path is outside of the voltage range, providing a command signal to a voltage regulation device and resetting the value of the counter to an initial value; and if the value of the counter is less than the maximum counter value, determining another the time rate of change of the voltage on the distribution path.

9. The method of claim 8, wherein incrementing a value of a counter associated with a time delay parameter of a voltage regulation device by an amount that is based on the determined time rate of change of the voltage on the distribution path comprises incrementing the value of the counter based on a sign of the determined time rate of change.

10. A control system for use with a voltage regulation device, the control system comprising:

one or more electronic processors; and a computer-readable medium storing instructions that, when executed, cause the one or more electronic processors to:

determine, from a voltage measurement obtained by the voltage regulation device, that a voltage on a distribution path is outside of a voltage range;

determine a time rate of change of the voltage on the distribution path, the time rate of change being determined based on at least two samples of the voltage at the distribution path obtained at different times; and change at least one operating parameter and/or an operating mode of the voltage regulation device based on the determined rate of change of the voltage.

11. The control system of claim 10, wherein one of the one or more operating parameters of the voltage regulation device comprises a time delay that defines a time period during which the voltage regulation device does not perform a voltage regulation operation and after which the voltage regulation performs the voltage regulation operation, the voltage regulation operation being an operation performed by the voltage regulation device to adjust the voltage in the electrical power distribution network, the time delay is associated with a counter, and the control system is configured to change a value of the counter by amount that is based on the determined metric related to the time rate of change of the voltage.

12. The control system of claim 10, wherein the electronic storage further stores default values for at least one operating parameter and a default operating mode, and the control system further comprises an input/output interface configure to accept input from a user of the control system, and the instructions further comprise instructions that, when executed, cause the one or more electronic processors to receive input from the input/output interface and to update the default value of the at least one operating parameter or the default operating mode.

* * * * *